Aug. 5, 1924.
W. E. WILLIAMS
BUMPER FOR AUTOMOBILES
Filed Oct. 17, 1923
1,503,969
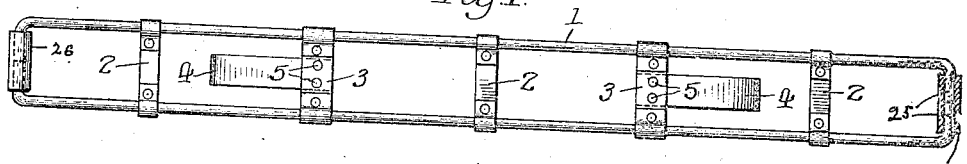
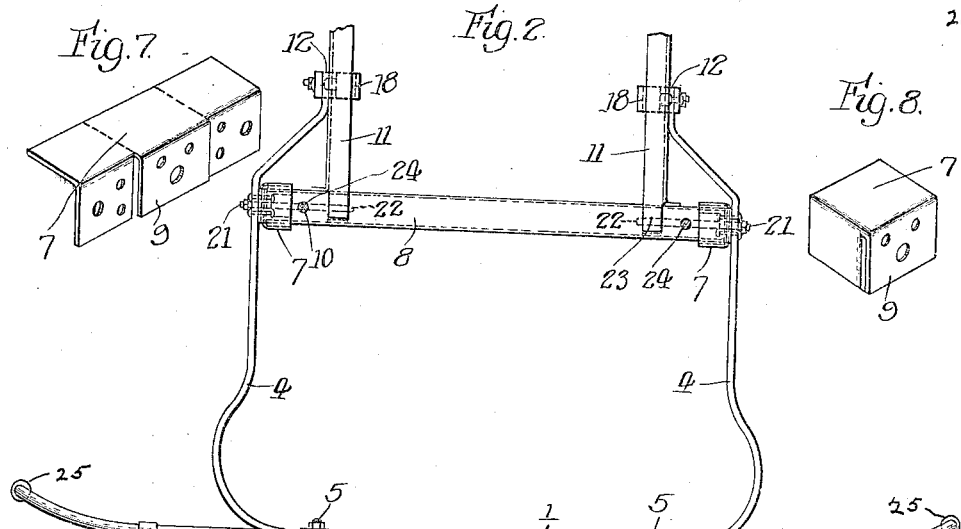
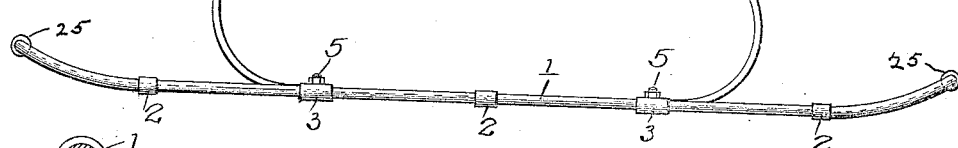
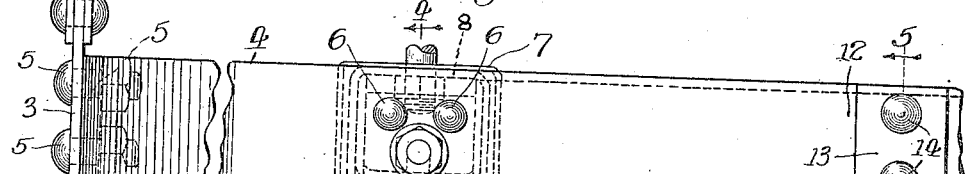
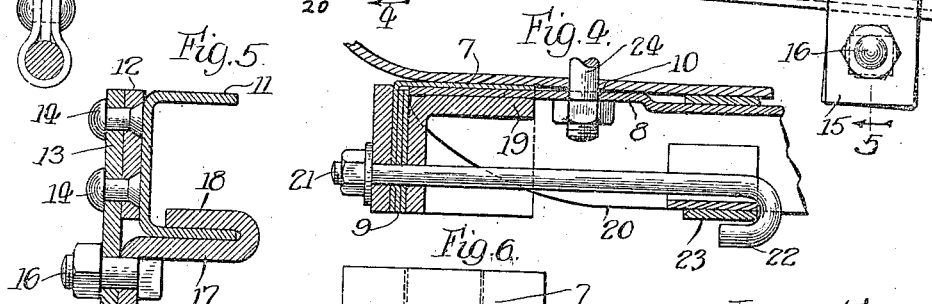

Patented Aug. 5, 1924.

1,503,969

UNITED STATES PATENT OFFICE.

WILLIAM ERASTUS WILLIAMS, OF WILMETTE, ILLINOIS.

BUMPER FOR AUTOMOBILES.

Application filed October 17, 1923. Serial No. 669,080.

*To all whom it may concern:*

Be it known that I, WILLIAM ERASTUS WILLIAMS, a citizen of the United States, and a resident of Wilmette, in the county of Cook and State of Illinois, have invented a new and useful Improvement in Bumpers for Automobiles, of which the following is a specification.

My invention relates particularly to a type of bumper used on the rear end of an automobile but may be used on other portions of such a vehicle. The particular automobile that this bumper is specifically adjusted to fit as shown by the drawing is the car known as Ford car.

Reference will be had to the accompanying drawings in which Fig. 1 is a front elevation of the collision bar of the bumper.

Fig. 2 is a plan of a portion of the rear end of the frame of the automobile and of my bumper connected thereto.

Fig. 3 is a side elevation of the bumper on a somewhat larger scale than that shown in Figs. 1 and 2.

Fig. 4 is a transverse section on line 4—4 of Fig. 3, showing a part of the connection to the frame.

Fig. 5 is a transverse section on line 5—5 of Fig. 3.

Fig. 6 is a plan view in the flat of the metal that is formed into a clip which goes over the end of the cross member of the automobile frame.

Fig. 7 is a perspective view of the metal after the first step taken in bending the metal of Fig. 8, into the clip, and Fig. 8 is a similar view after the second step which finally forms the finished clip.

In the drawing 1 indicates the collision bar here shown as a round rod formed into an elongated loop and connected across by clip members 2 and 3 and these clip members are connected to the ends of spring arms 4 by bolts 5.

Secured to the spring arms 4 by rivets 6, Fig. 3, are the clips 7 which amount to what might be termed a corner clip extending over and embracing the end of the cross member 8 of the automobile frame, and thus there is one thickness of clip metal on the top of this member 8 and three thicknesses of the clip metal at the end as indicated by 9 in Fig. 4, all made from the flat as shown in Fig. 6. A hole 10 in the cross member admits the bolts 24 which bolt the body of the automobile down on to this cross member of the frame.

The cross member 8 of the frame is connected to the horizontal frame members 11 which are in a channel form as shown by Fig. 5 and the inner ends 12 of my spring arms 4 are provided with blocks 13 riveted to the arms by the rivets 14 and these blocks 13 extend downward into the portion 15 and are pierced for bolts 16 which bolts 16 clamp the block 17 to the portion 15 and the block 17 has a lip 18 which extends over the lower flange of the channel member 11 of the frame, and thus the inner ends of the spring arms 4 are secured to the automobile frame.

The clips 7 as above described embrace the outer ends of the cross member 8 of the frame and as the body is bolted down on the top of these clips they are normally held down in place on the cross frame piece anyway, but for better security of the fastenings of the bumper to the frame I provide angle blocks 19 which extend in between the flanges 20 of the cross frame 8, see Fig. 4, and bear up snugly under the horizontal web portion of the cross frame piece.

The blocks 19 and the 3-ply section of the clips 7 and the spring arms 4 are pierced to admit the end of a J-bolt 21 the inner end of which is curved over at 22 and embraces a flange 23 of the horizontal frame member 11 and thus holds the spring arms 4 laterally in place with the clips 7 and the blocks 19 snugly embracing the cross frame piece 8, and thus the shock of the collision bar is transferred first to the cross piece 8 and the horizontal channel members 11 of the car.

Since the body of the car is bolted through the holes 10 to the cross frame piece 8 the latter is sustained in the shock also by the frame of the body itself.

In applying my bumper to the frame the bolts 24 which pass through the holes 10 that bolts the body down to the frame are loosened and the spring arms 4 are adjusted sidewise bringing the clips 7 and blocks 19 into embrace on the ends of the cross member 8 and when the same are adjusted home the said mentioned bolts 24 passing through the holes 10 are screwed down bringing the body down home upon the top portion of the clips 7 which is a very simple and easily performed operation and makes a secure fastening of the parts.

The clips 7 made as described are made out of relatively thin metal and yet since it embraces on four sides the cross member 8 of the frame it forms a very secure fastening. This metal for a Ford car is only 1/16 of an inch thick and may be even thinner and thus it does not make a material displacement of the body when the same is lifted slightly to allow the admission of the top portion of the clip 7 between the body proper and the cross member 8 of the frame.

The collision bar 1 here shown is composed of an upper and a lower bar bent toward each other at right angles as indicated by 25 and these ends are secured together by thimbles 26. The size of the holes in the thimbles in relation to the bars is such that the thimbles are forced by pressure on to the ends of the bars giving a secure and rigid fastening approaching the strength of an integral bar in so far as the requirements in a collision bar are concerned. This collision bar here shown is usually made out of hard steel and this is not readily welded, hence the use of these thimbles makes a cheaper connection than may be had otherwise consistent with production on a large scale of these parts which is a desideratum.

What I claim is:—

1. In apparatus of the class described, the combination with a vehicle frame having an end cross member, of a collision member having supporting arms secured at their inner ends to the frame and also secured to the frame by clips extending over and embracing the ends, respectively, of said cross member and held against lateral displacement by bolts, at some distance from their inner ends, passing transversely through them and secured to a frame member.

2. The combination with a vehicle frame having an end crossbar, of a horizontal collision bar at some distance outside the end portion of the frame, lateral arms secured to opposite sides of the frame, respectively, at some distance from its ends, and passing in proximity to the ends of the cross bar, respectively, and secured to the collision bar to support the same, and sheet metal clips embracing the ends, respectively, of the crossbar and also the adjacent portions of the corresponding arms.

3. In a device of the class described, a collision member supported by arms which are secured to the frame and means for securing the arms to the frame composed of a thin sheet metal clip interposed between the cross member of the frame and the body of the car, and secured to the said arms, and the said arms bolted transversely in the endwise direction of a cross member of the frame.

4. In a device of the class described, a collision member, supported by arms which are connected to the frame, blocks secured to the said arms and interposed between the flange members of the cross member of the frame, and a clip member associated with the said blocks and adapted to embrace the outside of the end of the cross member of the frame; in combination with a J-bolt extending through the supporting arms and connected to the frame and adapted to draw the arms laterally in connection to the frame.

5. In a device of the class described, a collision member, supported by arms connected to the frame, and said arms connected to the frame through the medium of a fastening composed of a clip member embracing the outside of the cross frame piece, and a block on the inside of the frame piece and the J-bolt holding the parts in position.

6. In a device of the class described, a clip for connecting the device to the frame of a car composed of a thin flat sheet of metal slit in portions and bent up to form a three sided box clip adapted to register over the end of a channel member of the frame.

Signed at Chicago, in the county of Cook and State of Illinois, this 11th day of October, 1923.

WILLIAM ERASTUS WILLIAMS.

Witnesses:
    HAZEL C. BUECKER,
    CLARA LOCKERBIE.